J. C. VAN AKEN.
TOY VEHICLE.
APPLICATION FILED AUG. 30, 1917.
1,273,290.
Patented July 23, 1918.
2 SHEETS—SHEET 2.
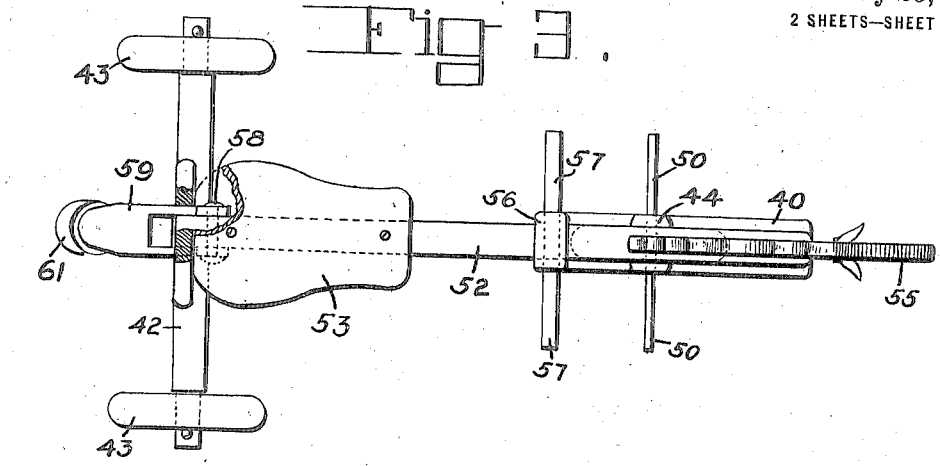
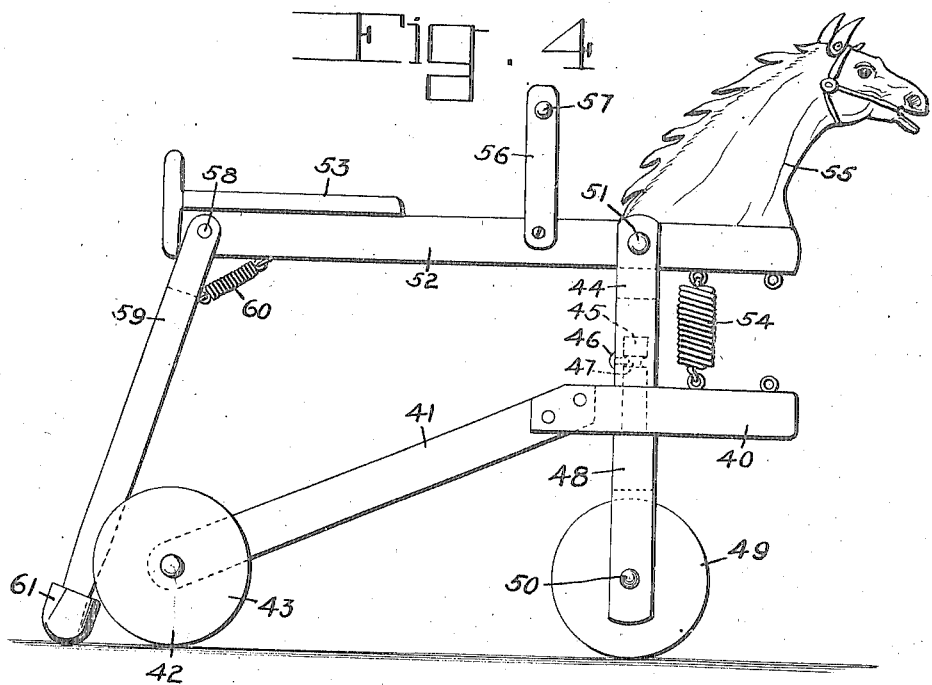
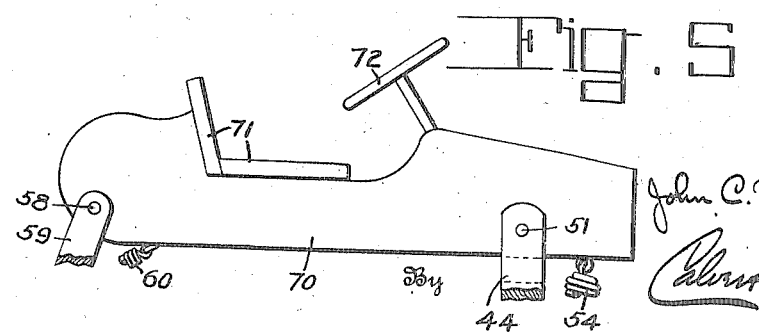

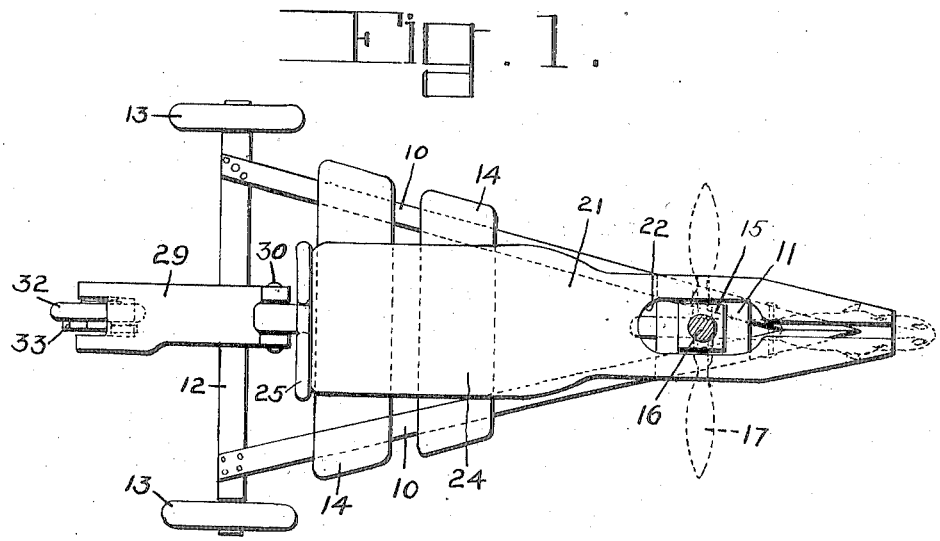
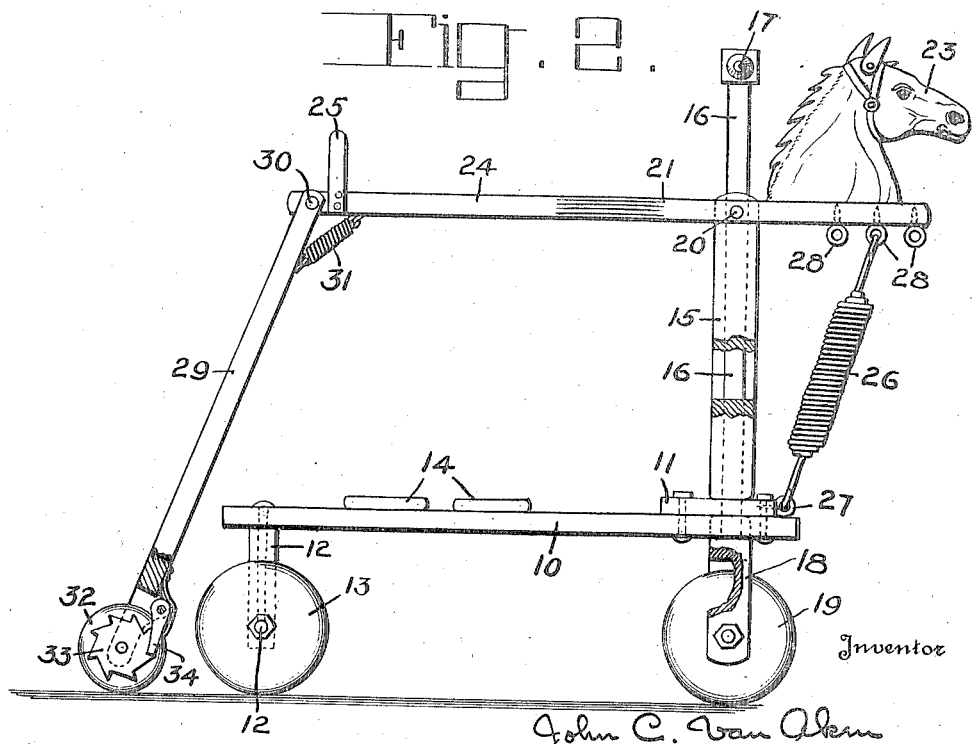

UNITED STATES PATENT OFFICE.

JOHN CLARK VAN AKEN, OF MANLIUS, NEW YORK.

TOY VEHICLE.

1,273,290.  Specification of Letters Patent.  Patented July 23, 1918.

Application filed August 30, 1917. Serial No. 188,900.

*To all whom it may concern:*

Be it known that I, JOHN CLARK VAN AKEN, a citizen of the United States, residing at Manlius, in the county of Onondaga and State of New York, have invented or discovered certain new and useful Improvements in Toy Vehicles, of which the following is a specification, reference being had therein to the accompanying drawings.

This invention relates to children's toy vehicles or cars and has for its general object the provision of a device of this character of simple and inexpensive construction having novel means whereby the same may be propelled by the rider.

The more particular objects of the invention, together with means whereby the same may be carried into effect, will best be understood from the following description of certain forms or embodiments thereof illustrated in the accompanying drawings. It will be understood, however, that the particular constructions described and shown have been chosen for illustrative purposes merely, and that the invention, as defined by the claims hereunto appended, may be otherwise practised without departing from the spirit and scope thereof.

In said drawings:

Figure 1 is a plan view, partly in section, and Fig. 2 a side elevation, partly broken away, of a vehicle constructed in accordance with the invention.

Figs. 3 and 4 are views similar to Figs. 1 and 2, respectively, of a modified construction.

Fig. 5 is a side elevation of another form of supporting and operating lever.

As shown in Figs. 1 and 2, the body of the vehicle comprises a triangular frame consisting of forwardly converging side members 10 secured at their front ends to a block or plate 11, and a transverse rear member 12 constituting a bolster at the ends of which are suitably journaled the rear wheels 13. Supported by the side members 10 intermediate their ends are one or more transverse strips or slats 14 constituting a foot-rest or platform. Journaled in the block or plate 11, and in a tubular upright 15 rising therefrom, is a steering post 16 provided at its upper end with a transverse handle or steering bar 17 and at its lower end with a fork 18 in which is suitably journaled a front or steering wheel 19. Pivoted, at 20, intermediate its ends, to the upright 15 is a lever 21, said lever as shown being formed with an opening 22 to receive the upright 15 and being pivoted to said upright at both sides thereof. The forward end of the lever 21 may, if desired, be provided with a fanciful figure, such as a horse's head 23. The rear end of the lever 21 constitutes a support for the rider and may be formed as or provided with a seat 24 having a back 25 to prevent the rider from slipping off rearwardly. The forward end of the lever 21, or the end thereof at the opposite side of the pivot 20 from the seat 24, is connected with the body of the vehicle by a spring 26 which constitutes a counterpoise for the weight of the rider on the seat 24, the strength of said spring being sufficient to counterbalance said weight only partially. The lower end of the spring is secured to an eye 27 projecting from the plate 11, while the upper end thereof may be engaged with any one of a plurality of eyes 28 arranged in a longitudinal series on the lever 21, whereby the effective moment of said spring may be varied or adjusted in accordance with the weight of the child using the vehicle. 29 denotes a pusher lever having a bifurcated upper end pivoted, at 30, to the reduced rear end of the lever 21, said pusher being also connected to said lever 21 by a spring 31. The lower end of the pusher lever 29 is also bifurcated and has journaled between its arms a wheel 32 carrying a ratchet wheel 33 engaged by a pawl 34 carried by the lever. The arrangement of the pawl and ratchet is such that the rotation of the wheel 32 is limited to the forward direction, that is to say, to the direction caused by engagement of said wheel with the ground when the vehicle moves forwardly.

The operation of the device is as follows: The child, having seated himself astride the seat 24 with his feet resting upon the platform 14 and with his hands grasping the steering bar 17, so flexes his knees as to move his body up and down, causing the lever 21 to oscillate upon its pivot 20. When the child allows his body to descend, the rear end of the lever 21 is depressed, and when he raises his weight from the seat 24 the spring 26 causes said rear end of the lever 21 to be elevated. As the rear end of the lever 21 descends the lower end of the pusher 29 exerts a reaction against the ground or other surface over which the vehicle is to move, the wheel 32 being at this time locked by the pawl 34 and ratchet 33 against retrograde movement, so that said wheel at this time acts as a fixed part of the pusher lever 29, causing said lever to propel the vehicle forwardly. As the rear end of the lever 21 rises, the spring 31 draws the pusher lever 29 forwardly, the wheel 32 at this time turning freely upon its journals to allow the lower end of said pusher to engage the ground at a new point. Thus successive oscillations of the lever 21 cause the pusher 29 to exert against the ground a series of pushes or impulses tending to propel the vehicle in a forward direction. When sufficient momentum has been developed, or in coasting down an incline, it will be seen that the wheel 32 will turn freely, so that the forward travel of the vehicle is not retarded.

In the construction shown in Figs. 3 and 4, the vehicle body comprises a frame consisting of a horizontal member 40 to the rear end of which is rigidly secured a downwardly and rearwardly inclined member 41 carrying at its lower end a transverse axle 42 upon the ends of which are suitably journaled the rear wheels 43. Freely journaled in the frame member 40 and in an upright 44 rising therefrom is a pintle 45 retained in the upright 44 by a pin 46 whose end engages a groove 47 in said pintle. The pintle 45 carries at its lower end a fork 48 in which is journaled a front or steering wheel 49, the axle or journal of said wheel being extended in opposite directions, as at 50, to form a foot-rest and by means of which the vehicle may be steered by the feet of the rider. The upper end of the standard 44 is bifurcated, and between the arms thereof is pivoted, at 51, a lever 52 carrying at its rear end a seat 53 substantially as in the form of the invention first described. Also, as in the first form of the invention, the forward end of the lever 52 in advance of the pivot 51 is connected by means of an adjustable counterpoise spring 54 with the body of the vehicle, herein with the frame member 40. The lever 52 may, if desired, carry at its forward end a fanciful figure head 55, and is also preferably provided with a rigid upright 56 provided with hand-holds 57. Pivoted at 58 to the rear end of the lever 52 is the bifurcated upper end of a pusher lever 59 connected with the lever 52 by a spring 60 and carrying at its lower end a suitable ground-engaging shoe 61.

The operation of the form of the invention last described is substantially the same, in principle, as that of the construction shown in Figs. 1 and 2 and will be understood without further explanation.

The lever 24, shown in Figs. 1 and 2, and the lever 52, shown in Figs. 3 and 4, may assume a wide variety of forms in accordance with the fancy of the manufacturer or the demand of the trade. Thus, for example, there is shown in Fig. 5 a lever 70 adapted to be substituted for the lever 52 shown in Figs. 3 and 4. The lever 70 is roughly shaped to represent, in configuration, the body of an automobile, being provided with a seat 71 and with a rigid handhold 72 constructed to resemble in appearance a steering wheel. The connection of the lever 70 with the body and other parts of the vehicle will be obvious from the drawing.

Having thus described my invention I claim and desire to secure by Letters Patent:

1. A vehicle of the character described comprising a wheeled body provided with a foot-rest, an upright carried by said body, a seat pivoted to said upright, and a pusher operated by said seat and engaging at its lower end the surface over which the vehicle moves.

2. A vehicle of the character described comprising a wheeled body provided with a foot-rest, an upright carried by said body, a seat pivoted to said upright, a lever pivoted at its upper end to the rear end of said seat and engaging at its lower end the surface over which the vehicle moves, and a spring connecting said lever and seat.

3. In a vehicle of the character described, in combination, a pivoted support for the rider, an adjustable counterpoise for said support, and means operated by said support for propelling the vehicle.

4. In a vehicle of the character described, in combination, a pivoted support for the rider, an adjustable counterpoise for said support, and a pusher operated by said support and engaging at its lower end the surface over which the vehicle moves.

5. In a vehicle of the character described, in combination, a body, a lever pivoted to said body and constituting at one side of its pivot a support for the rider, a spring connecting said body with said lever at the opposite side of its pivot, means whereby said spring may be secured to said lever at any one of a plurality of points, and means operated by said lever for propelling said vehicle.

6. A vehicle of the character described comprising a wheeled body provided with a foot-rest, an upright carried by said body, a lever pivoted to said upright and having a seat portion at one side of its pivot, a spring connecting said body with said lever at the opposite side of its pivot, means whereby said spring may be secured to said lever at any one of a plurality of points, and a pusher operated by said lever and engaging at its lower end the surface over which the vehicle moves.

7. In a vehicle of the character described, in combination, a pusher lever having a free lower end, a wheel carried by the lower end of said lever and engaging the surface over which the vehicle moves, means for limiting the rotation of said wheel to a forward direction, and means for operating said pusher lever.

8. In a vehicle of the character described, in combination, an oscillating support for the rider, a pusher lever pivoted at its upper end to said support and having a free lower end, a wheel carried by the lower end of said lever and engaging the surface over which the vehicle moves, and means for limiting the rotation of said wheel to a forward direction.

9. A vehicle of the character described comprising a wheeled body provided with a foot-rest, an upright carried by said body, a lever pivoted to said upright and having a seat portion at one side of its pivot, a spring connecting said body with said lever at the opposite side of its pivot, means whereby said spring may be secured to said lever at any one of a plurality of points, a pusher pivoted at its upper end to the rear end of said lever, a spring connecting said pusher and lever, a wheel carried by the lower end of said pusher and engaging the surface over which the vehicle moves, and means for limiting the rotation of said wheel to a forward direction.

In testimony whereof I affix my signature.

JOHN CLARK VAN AKEN.

Witnesses:
J. F. DICKERSON,
CHAS. E. COLE.